United States Patent
Thibert et al.

(12) 
(10) Patent No.: US 6,397,058 B1
(45) Date of Patent: May 28, 2002

(54) SYSTEM AND METHOD FOR PROVIDING ROAMING INCOMING SCREENING (RIS) IN A WIRELESS INTELLIGENT NETWORK

(75) Inventors: Myriam Thibert, Lasalle; Paul Gantous, Montreal; Charles Gelibet, Pierrefonds; Giuseppe Conte, Montreal, all of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/298,704

(22) Filed: Apr. 23, 1999

Related U.S. Application Data
(60) Provisional application No. 60/099,588, filed on Sep. 9, 1998.

(51) Int. Cl.$^7$ ................................................. H04M 3/42
(52) U.S. Cl. ........................ 455/414; 455/432; 455/445
(58) Field of Search ................................. 455/414, 432, 455/445, 461, 518, 519, 433; 379/112, 142

(56) References Cited

U.S. PATENT DOCUMENTS

| | | | |
|---|---|---|---|
| 5,467,388 A | 11/1995 | Redd, Jr. et al. ........... | 379/196 |
| 5,473,671 A | * 12/1995 | Partridge, III ............... | 379/59 |
| 5,890,064 A | * 3/1999 | Widergen et al. ........... | 455/445 |
| 5,918,177 A | * 6/1999 | Corriveau et al. .......... | 455/432 |
| 6,026,298 A | * 2/2000 | Lamb et al. ................. | 455/433 |

FOREIGN PATENT DOCUMENTS

| | | |
|---|---|---|
| EP | 0 788 287 A2 | 8/1997 |
| WO | WO 96/13949 | 5/1996 |
| WO | WO 97/06647 | 2/1997 |
| WO | WO 97/20423 | 6/1997 |
| WO | WO 97/20441 | 6/1997 |
| WO | WO 97/26769 | 7/1997 |
| WO | WO 98/09425 | 3/1998 |

\* cited by examiner

*Primary Examiner*—Thanh Cong Le
*Assistant Examiner*—Lana Le
(74) *Attorney, Agent, or Firm*—Smith, Danamraj & Youst, P.C.

(57) ABSTRACT

A system and method of controlling the delivery of an incoming call in a radio telecommunications network based on the location of a roaming mobile subscriber. The radio telecommunications network includes a home network which comprises a Home Location Register (HLR) and a Service Control Point (SCP). The geographic area covered by the network comprises a plurality of regions, including the home area covered by the home network. Each of the regions comprises one or more service areas, each of which is served by a mobile switching center (MSC) having an identification indicator (MSCID). The plural MSCIDs are clustered into groups, each of which covers a corresponding region. The HLR keeps a subscriber profile which includes a termination service trigger, in addition to keeping track of the subscriber's location. The SCP includes a service profile record which comprises one or more call delivery/termination service options. The service profile record also stores an indication for each group whether an incoming call is to be delivered to the mobile subscriber when roaming in the area or regions covered by the group. A gateway MSC interrogates the home HLR for the subscriber's location when an incoming call is received thereat. The HLR, in turn, depending upon the termination service trigger, queries the SCP for appropriate call delivery options.

21 Claims, 7 Drawing Sheets

FIG.2

| REGION/ GROUP | GROUP ID | MSCID |
|---|---|---|
| 102-B | GROUP-1 | #1;#2;#6;#11 |
| 102-E | GROUP-2 | #3;#7;#8;#12;#13;#14 |
| 102-A | GROUP-3 | #4;#5;#9;#10 |
| 102-D | GROUP-4 | #15;#19;#20 |
| 102-C | GROUP-5 | #16;#17;#18 |

FIG.3A

| SUBSCRIBER ID | CALL WAITING | CALL FOWARD | TERM. WIN TRIGGER | ..... | ROAMING PROFILE | PERSONAL INFORMATION |
|---|---|---|---|---|---|---|
| 301 | 302 | 304 | 305 | | 308 | 310 |

300A

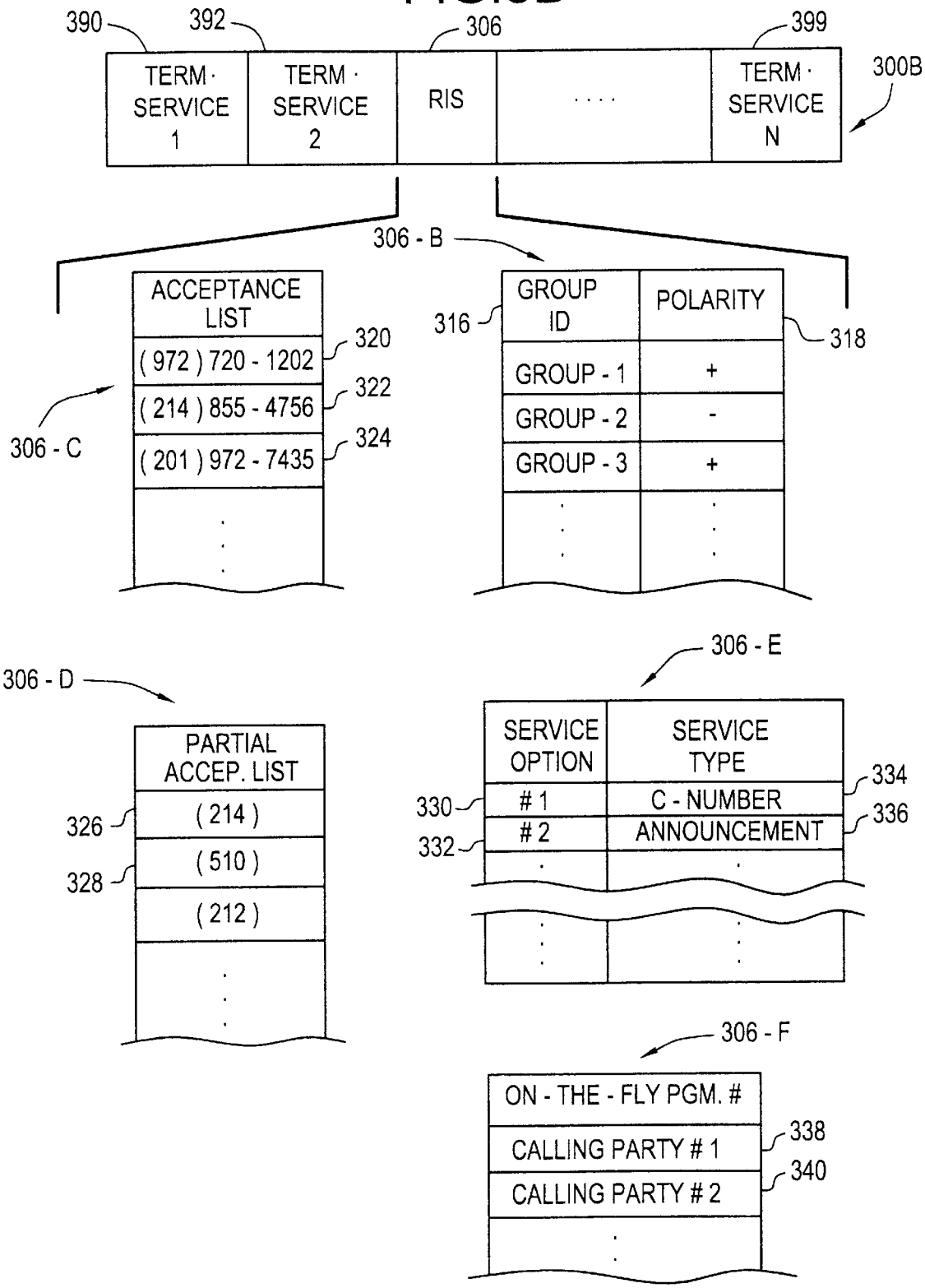

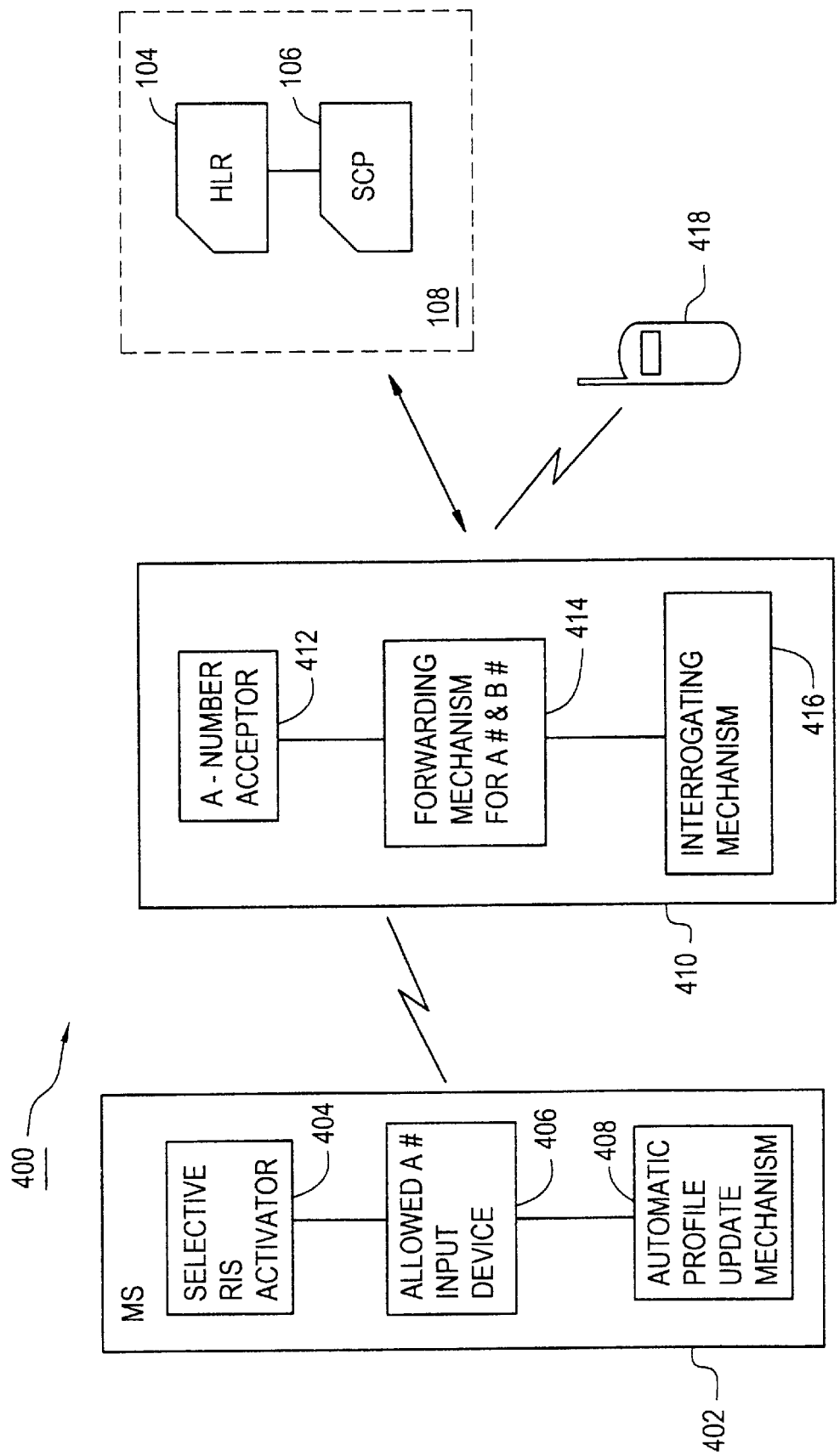

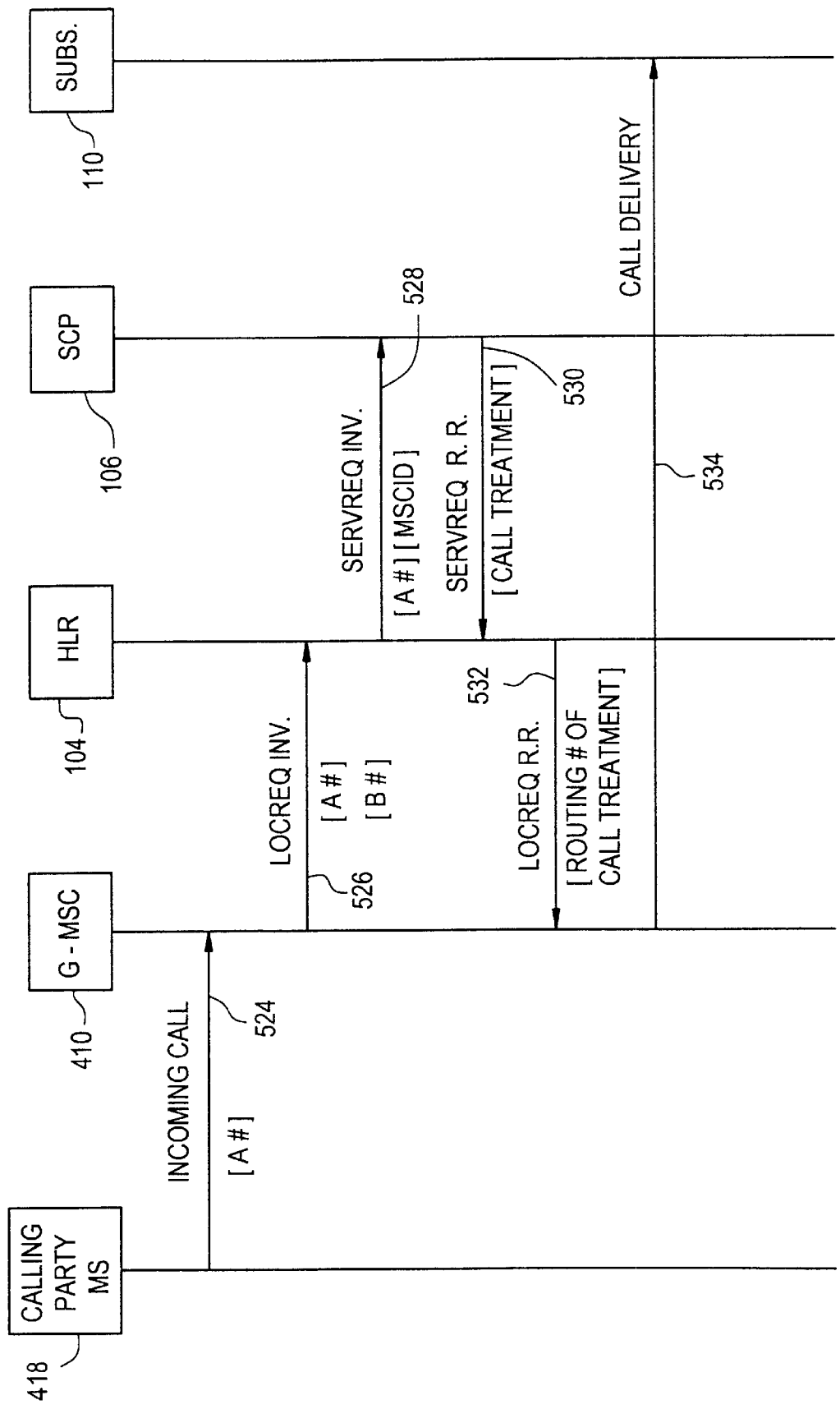

SYSTEM AND METHOD FOR PROVIDING ROAMING INCOMING SCREENING (RIS) IN A WIRELESS INTELLIGENT NETWORK

PRIORITY UNDER 35 U.S.C. §119(e) & 37 CFR §1.78

This nonprovisional application claims priority based upon the following prior filed copending U.S. provisional patent application entitled "System and Method for Providing Roaming Incoming Screening (RIS) in a Wireless Intelligent Network (WIN)," Ser. No.: 60/099,588, filed Sep. 9, 1998, in the names of Myriam Thibert, Paul Gantous, Charles Gelibet and Giuseppe Conte.

BACKGROUND OF THE INVENTION

1. Technical Field of the Invention

This invention relates to telecommunication systems and, more particularly, to a system and method for providing roaming incoming screening (RIS) in a wireless intelligent network (WIN) wherein a mobile subscriber can selectively block incoming calls while roaming in a visited service area.

2. Description of Related Art

Subscriber services in the radio telecommunications industry are generally categorized into the following groups: (i) originating services, (ii) terminating services, (iii) network services, and (iv) transferring services. Whereas providing better subscriber services overall has always been a much sought-after goal in the industry since its beginnings, it is the improvements in terminating services that has garnered wide attention recently. Two concerns, significant for today's users of radio telecommunications services (also commonly known as mobile subscribers), appear to provide the impetus in this regard: pricing and flexibility regarding incoming-call acceptance. In some geographic areas where a "called party pays" pricing system is prevalent, these two concerns overlap to a large extent.

Terminating services are defined as services that are invoked when a calling party attempts to reach a subscriber and typically relate to how an incoming call from the calling party is to be handled. The services are triggered by the reception of the destination number (or B-number) of the called party. While several solutions currently exist with respect to providing flexibility in accepting incoming calls, these solutions are typically directed to time-based mechanisms for selectively blocking incoming telephone calls. These current solutions, however, do not address the issue of providing flexibility in accepting incoming calls based on the location of a mobile subscriber — an important consideration when the called party has to pay applicable long distance tolls and roaming charges as well.

Accordingly, based upon the foregoing discussion, it should be readily appreciated that in order to overcome the deficiencies and shortcomings of the existing solutions, it would be advantageous to have a method and system for providing an incoming-call screening mechanism in a radio telecommunications network based on a subscriber's location. The present invention provides such a method and system.

SUMMARY OF THE INVENTION

In one aspect, the present invention is directed to a radio telecommunications network system covering a geographic area that is comprised of a plurality of service areas, each of which is served by a mobile switching center (MSC). The MSCs are identified by an identification indicator (MSCID). The plurality of MSCIDs are clustered into one or more groups, each of which covers a corresponding geographic area, defined as a region. The network system includes a Home Location Register (HLR) which comprises a subscriber profile record associated with a mobile subscriber. The subscriber profile record includes a service trigger for invoking a termination service. The HLR also includes a mechanism for generating a call treatment instruction based on the termination service trigger in the subscriber profile record. The network system further includes a Service Control Point (SCP) for executing a call delivery service script in response to the call treatment instruction provided by the HLR. The SCP includes a service profile record having an indication that an incoming call placed by a calling party is not to be delivered to the mobile subscriber when the mobile subscriber is located in a first region served by an MSC in a first MSCID group. In alternative embodiments, the termination service trigger may be provided by another SCP or one of the MSCs participating in the radio telecommunications network.

In another aspect, the present invention is directed to a radio telecommunications network system which comprises a first plurality of MSCs, each of which serves a first corresponding service area and a second plurality of MSCs, each of which serves a second corresponding service area. The network system also includes an HLR for keeping track of a mobile subscriber's location and for storing the mobile subscriber's service category profile, wherein the service category profile includes a service trigger. An SCP is provided in the network system for executing one or more service scripts associated with the mobile subscriber, responsive to the service trigger in the HLR. The SCP includes a service profile record having at least one indication that when the mobile subscriber is located in the first corresponding service area, an incoming call placed by a calling party is to be delivered to the mobile subscriber and at least one indication that when the mobile subscriber is located in the second corresponding service area, the incoming call placed by the calling party is not to be delivered to the mobile subscriber.

In a yet further aspect, the present invention is related to a method of call termination with respect to a mobile subscriber in a radio telecommunications network. An incoming call from a calling party, wherein the incoming call is intended for the mobile subscriber, is received by an MSC of the network system. The MSC interrogates an HLR to determine the location of the mobile subscriber. The HLR then determines whether there is a suitable service trigger available for the mobile subscriber. In response to the determination step, an SCP determines whether the incoming call is to be delivered to the mobile subscriber, based on the mobile subscriber's location. Then the incoming call is selectively delivered to the mobile subscriber.

BRIEF DESCRIPTION OF THE DRAWINGS

A more complete understanding of the present invention may be had by reference to the following Detailed Description when taken in conjunction with the accompanying drawings wherein:

FIG. 2 depicts an exemplary grouping scheme for a plurality of participating mobile switching centers that serve the regions of the coverage area of the radio telecommunications network;

FIG. 3A depicts a presently preferred exemplary embodiment of a subscriber profile stored as a record in a Home Location Register;

FIG. 3B depicts a presently preferred exemplary embodiment of a termination service profile provided in a Service Control Point;

FIG. 4 depicts a functional block diagram of an exemplary call delivery system provided in accordance with teachings of the present invention;

FIG. 5B depicts a signal flow pathway illustrating an exemplary call delivery method provided in accordance with teachings of the present invention.

DETAILED DESCRIPTION OF THE DRAWINGS

The innovative teachings of the present patent application will be described with particular reference to numerous exemplary embodiments. However, it should be understood that this class of embodiments provides only a few examples of the many advantageous uses of the innovative teachings contained herein. In general, statements made in the specification of the present application do not necessarily limit any of the various claimed aspects of the present invention. Moreover, some statements may apply to some inventive features but not to others.

Figure 1:
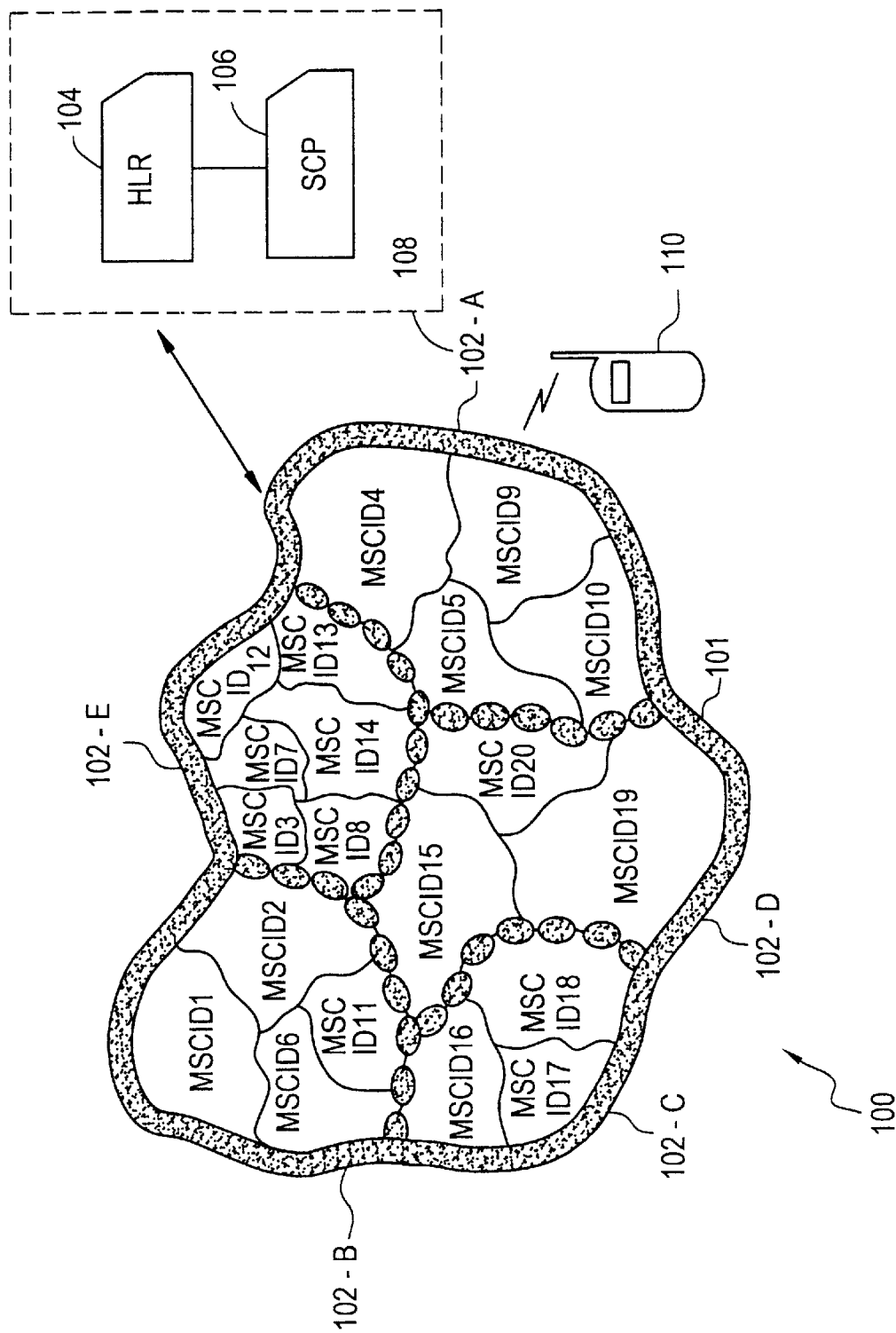
FIG. 1 is a functional block diagram which illustrates an exemplary radio telecommunications network system covering a plurality of regions where an incoming call is selectively delivered to a mobile subscriber in accordance with the teachings of the present invention.

In the drawings, like or similar elements are designated with identical reference numerals throughout the several views, and the various elements depicted are not necessarily drawn to scale. Referring now to FIG. 1, depicted therein is a functional block diagram illustrating an exemplary radio telecommunications network system 100 provided as a Wireless Intelligent Network (WIN). The network system 100 covers a geographic area 101 that comprises a plurality of service areas, each of which is served by a mobile switching center (MSC) having an identification indicator (MSCID). By way of example, 20 such service areas are depicted in FIG. 1, with associated mobile switching centers MSCID-1 to MSCID-20 participating in the WIN. A mobile subscriber 110, symbolically represented as a mobile station herein, may be located anywhere in the plurality of service areas shown in this FIG., and as will be described in greater detail hereinbelow, is provided with the capability to selectively screen incoming calls while located in this geographic area 101.

In accordance with the teachings of the present invention, the plurality of MSCIDs may be clustered into one or more groups, each of which comprises at least one MSC. For example, five groups, labeled with reference numerals 102-A through 102-E are depicted in FIG. 1. Each of the groups covers a portion of the geographic area 101, defined as a region. These regions are demarcated with thicker lines in FIG. 1. It should be readily apparent to those of ordinary skill in the art upon reference hereto that one such group may be operably associated with a Home Location Register (HLR) 104 and a Service Control Point (SCP) 106 to form a home network to serve the mobile subscriber's home service area. In the exemplary embodiment shown, the network group 102-A comprises the home network for the mobile subscriber 110 and the area portions served by MSCID-4, MSCID-5, MSCID-9 and MSCID-10 comprise the mobile subscriber's home service area. The rest of the geographic area served by the other groups, accordingly, may be deemed as one or more visited service areas (or roaming areas) of the mobile subscriber 110.

The HLR 104 and SCP 106 may be co-located as part of a service node 108. It should be appreciated that the HLR 104 and SCP 106 may also be provided in some exemplary implementations as separate entities. In either situation, the HLR 104 is provided primarily to keep track of the mobile subscriber's location and service category profile, and to deliver routing information to interrogating MSCs. The SCP 106 executes various WIN service scripts based on the information stored in the subscriber's service profile for providing subscriber services.

Referring now to FIG. 2, an exemplary grouping scheme for the participating MSCs that serve the geographic area 101 is shown in tabular form. Each group of MSCs may be provided with an identification indicator (Group-ID). For example, the five groups described above are identified as Group-1 through Group-5 here. The home network 102-A is identified as Group-3 in this exemplary embodiment, although in some implementations, a home network may preferably be provided as Group-0.

FIG. 3A depicts an exemplary embodiment of a subscriber profile 300A stored as a record in the HLR 104 for the mobile subscriber 110. The subscriber profile 300A preferably comprises a suitable subscriber ID portion 301 in addition to a plurality of service portions for various services to which the subscriber 110 has subscribed, a roaming profile portion 308 for location tracking and an optional personal information portion 310. The plurality of service portions may comprise commonly known services such as a call waiting portion 302, a call forward portion 304, and one or more WIN service triggers such as, for example, a termination WIN trigger portion 305.

Accordingly, for the purpose of effectuating WIN services, the HLR 104 preferably includes a suitable WIN trigger such that the control is passed to the SCP 106 for executing an appropriate service script when the WIN trigger is invoked. It should be appreciated that the SCP 106 may also be triggered directly by an MSC or another SCP for providing appropriate call treatment.

In accordance with the teachings of the present invention, a call terminating service or termination WIN service, specifically identified as a roaming incoming screening (RIS) service portion 306, is provided as part of a service profile 300B provided in the SCP 106. FIG. 3B depicts an exemplary embodiment of the service profile 300B which includes a plurality of termination WIN services portions, for example, termination service portion 1 (labeled by reference numeral 390), termination service portion 2 (labeled by reference numeral 392), RIS portion 306 and termination service portion N (labeled by reference numeral 399).

As is understood in the art, a termination service (or, a call terminating service) is a service that is invoked when a calling party attempts to reach a B-subscriber, for example, the mobile subscriber 110 operating within the WIN system 100. The service is typically triggered by the reception of the destination number (B-number or called party's number) in the HLR. Also, the termination service typically requires the passing of an A-number (calling party's number) to the SCP. In a presently preferred exemplary embodiment, the B-subscriber is designated as a WIN subscriber in the home HLR.

While a mobile subscriber can have a subscription to a particular WIN service as an individual, it is also possible to obtain a subscription to a particular service as a member of a group, called a Selective User Group (SUG). Typically, individual subscriptions can have only individual data in the service profiles while a SUG subscription profile can have both SUG member data and SUG group data. Accordingly, it should be appreciated by those skilled in the art that although the teachings of the present invention are exemplified by way of an individual subscriber's service profile, these teachings are equally applicable for SUGs and SUG members, *mutatis mutandis*. It should also be appreciated that while several termination services are realizable (for example, Selective Call Acceptance or SCA, Selective Call Forwarding or SCF, Selective Call Rejection or SCR, or Time Call Forwarding or TCF), the present invention is directed more particularly to a system and method for providing the RIS service.

Depending upon implementational objectives, several RIS features may be provided in accordance herewith. When the participating MSCIDs are clustered into groups with group identification indicators, a polarity indicator 318 may be used with a Group ID list 306-B. For example, Group-1 is shown with a positive polarity to indicate that when the mobile subscriber 110 is located in the area or regions served by the MSCs assigned to Group-1, the incoming call will be delivered. Accordingly, the IDs of all MSCs (that is, MSCIDs) comprising Group-1 are preferably tagged with a positive polarity to indicate that the subscriber 110 would accept an incoming call when the subscriber is located in the service area served by an MSC (which may also be referred to as destination MSC) of Group-1. In a typical implementation, a group ID associated with the mobile subscriber's home service area may always be assigned a positive polarity.

Continuing to refer to FIG. 3B, a screening list 306-C comprising one or more complete A-numbers may also be provided as part of the RIS service portion 306 for the mobile subscriber 110 to indicate that when an incoming call is placed from one of these numbers, the call will be accepted and delivered to the mobile subscriber regardless of its location in the network 100, that is, regardless of the polarity assigned to the destination region. Another related feature, a partial A-number list 306-D, may be provided where call delivery is predicated upon only a portion of the A-number, for example, an area code portion 326, regardless of the value of the destination region.

When an incoming call is not delivered to the mobile subscriber 110 because of the screening mechanisms described above, a service option portion 306-E may be provided as part of the RIS service profile for the subscriber. A particular service process or mechanism (reference numerals 334 or 336, for example) may be invoked, depending upon the service option. Based on the calling party's number (i.e., A-number), the incoming call may be forwarded to a voice mail system or an optional call forwarding number (C-number). Also, a pre-recorded announcement may be provided to the calling party when its call cannot be terminated with the mobile subscriber.

Yet another RIS service option, a dynamic A-list 306-F, may be effectuated by providing the capability to the mobile subscriber to program (or input) one or more A-numbers using its mobile station so that an incoming call from these numbers will always be delivered regardless of the location of the subscriber. It should be apparent that such an "on-the-fly" mechanism could be selectively modified to operate with specific time windows, destinations, et cetera.

Referring now to FIG. 4, a functional block diagram of an exemplary call delivery system 400 is shown. Reference numeral 402 refers to a functional block diagram of a mobile station used by the mobile subscriber 110 (shown in FIG. 1). The mobile station 402 preferably comprises a selective RIS activator 404 for selectively activating a RIS service provided in accordance with the teachings of the present invention. Further, the mobile station 402 includes an input device 406 for selectively activating or inputting on-the-fly an allowed A-number and an automatic profile update mechanism 408 for effectuating automatic updates to the subscriber profile in the HLR 104, the service profile in the SCP 106, or both.

Reference numeral 410 refers to a functional block diagram of a gateway MSC (G-MSC) that receives an incoming call placed by a calling party 418. The G-MSC 410 preferably comprises an acceptor 412 for accepting the calling party's number (A-number), a mechanism 414 for forwarding the A- and B-numbers to the home HLR/SCP complex 108, and an interrogating mechanism 416 for interrogating the HLR/SCP complex by way of a suitable control message, e.g., a Location Request or LOCREQ Invoke message.

Figure 5A:
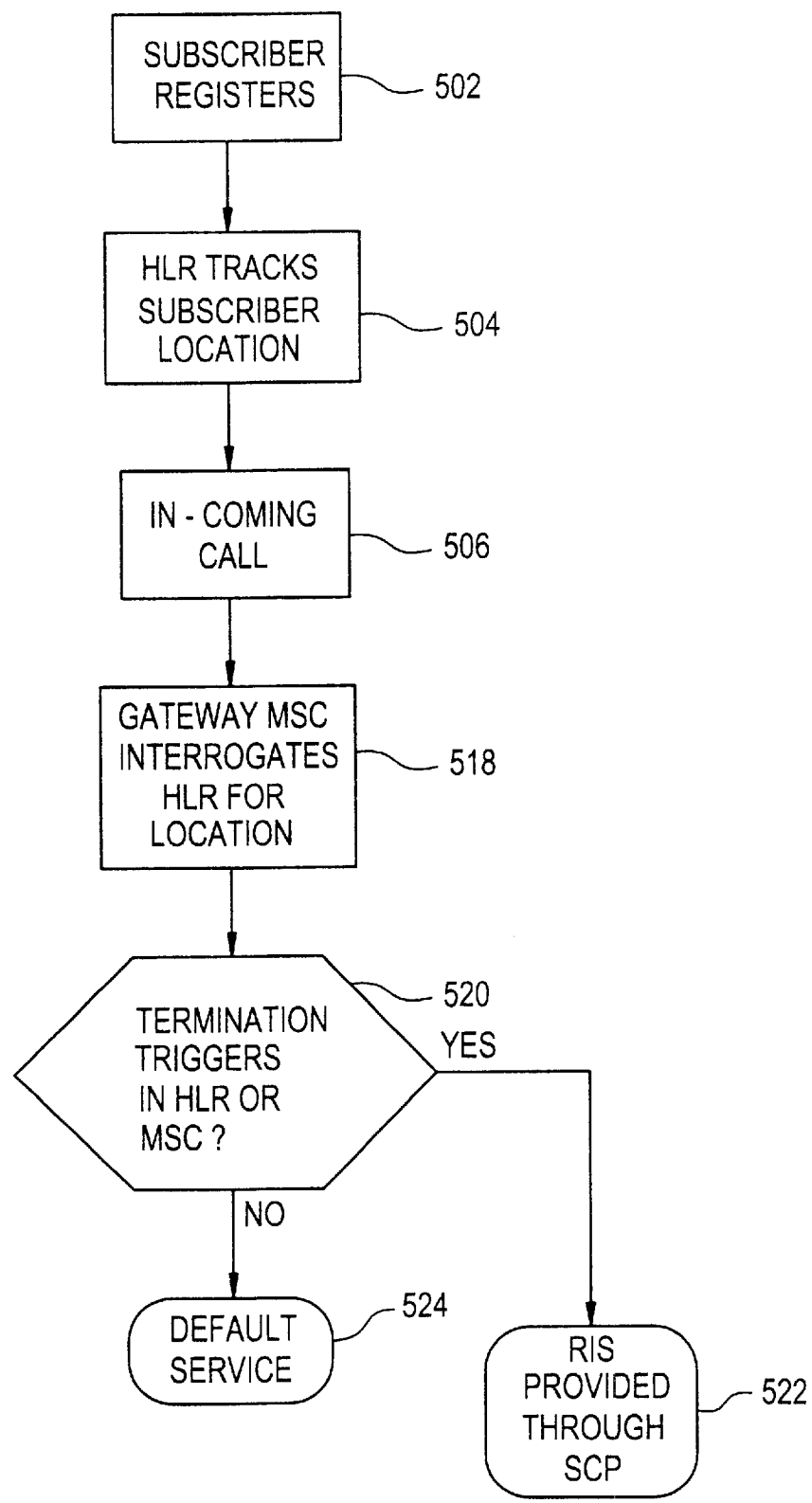
FIG. 5A depicts a flow diagram of an exemplary call delivery method provided in accordance with teachings of the present invention.

FIGS. 5A and 5B depict a flow diagram and a signal flow pathway, respectively, of an exemplary call delivery (or call termination) method provided in accordance herewith. Upon registration by the mobile subscriber 110 in the network system 100 (step 502), the home HLR 104 tracks the location of the mobile subscriber in relation to the MSCID that serves the subscriber (step 504). An incoming call (step 506) initiates a decision process in the G-MSC 410, pursuant to which it interrogates the HLR 104 for proper handling of the incoming call and the location of the subscriber (step 518). The signal paths 524 and 526 in FIG. 5B correspond to these steps. The A-number is provided to the G-MSC 410 by way of the signal path 524. A LOCREQ Invoke message is provided to the HLR 104 via the signal path 526. The A- and B-numbers are passed to the HLR along with this LOCREQ message.

The HLR 104 determines the appropriate destination MSCID based on the current location of the mobile subscriber. If a suitable termination WIN trigger exists for the mobile subscriber (decision block 520), the incoming call is handled in accordance therewith, by invoking appropriate service scripts in the triggered SCP 106 (step 522). This handling process, described in greater detail in specific reference to FIG. 6 hereinbelow, is shown in FIG. 5B as signal paths 528, 530 and 532, and the call delivery signal path 534 to the mobile subscriber 110, provided the call is accepted. A Service Request or SERVREQ Invoke message is propagated from the HLR 104 via the path 528 to the SCP 106. The A-number and the MSCID parameter are preferably transmitted along therewith. In the servreq Return Result message, propagated via the path 530 by the SCP 106, suitable call treatment parameters are provided to the HLR 104. The routing number of the call treatment as per the service script executed by the SCP 106 is then provided by the HLR 104 to the G-MSC 410 via the locreq Return Result message path 532. The incoming call is delivered to the mobile subscriber 110 via the call delivery path 534, provided the servreq Return Result message from the SCP service script included an appropriate result. If no termination WIN trigger is available for the mobile subscriber, for example, in the HLR 104, the G-MSC 410 may utilize a default service procedure for handling the incoming call (step 524).

Figure 6:
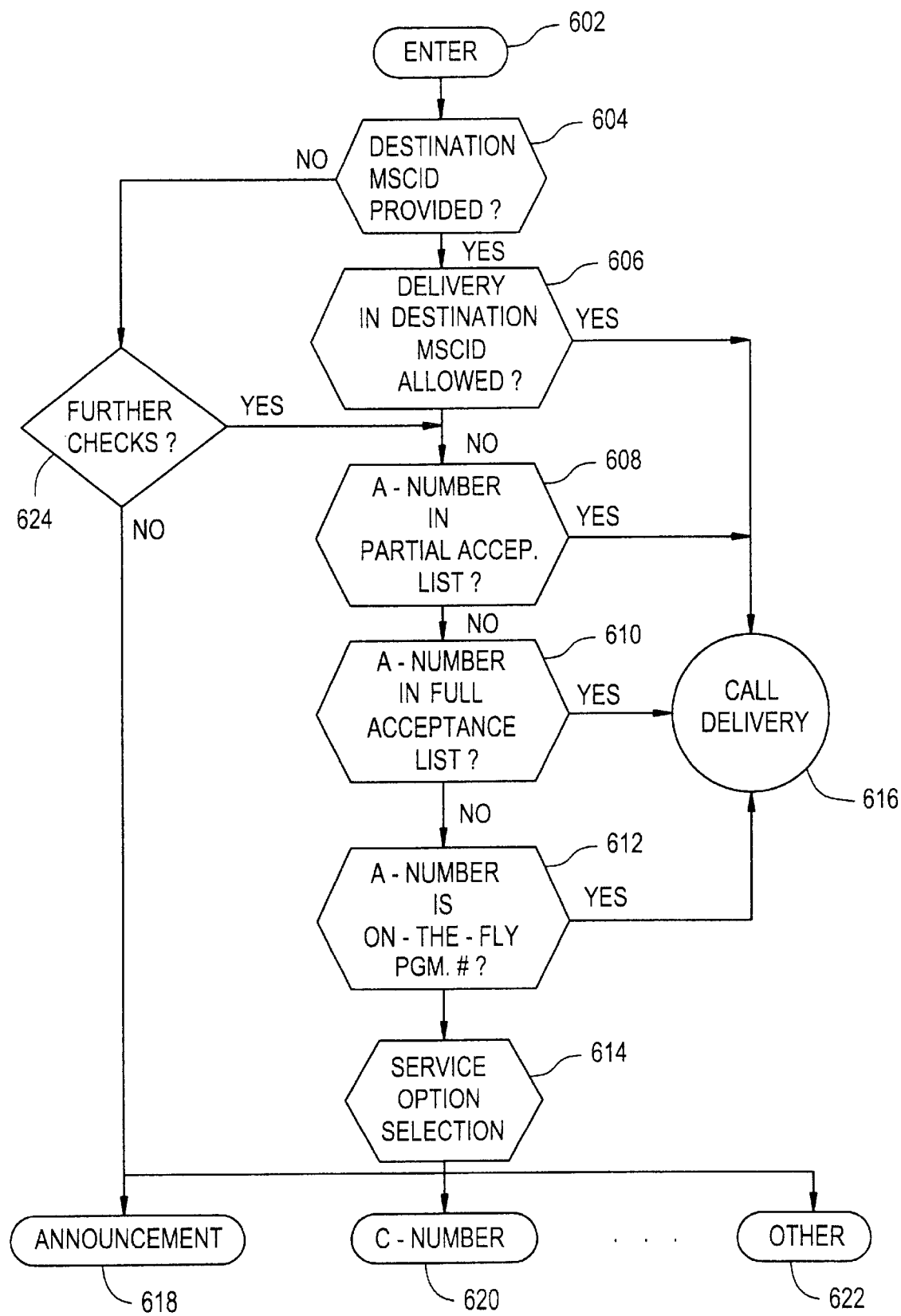
FIG. 6 depicts a flow diagram of an exemplary call handling/screening method based on a service profile provided in accordance with the teachings of the present invention.

FIG. 6 depicts a flow diagram of an exemplary incoming call handling method based on a RIS service profile that is provided in accordance with the teachings of the present invention. One or more decision processes may take place depending upon the RIS service or option profile in the home SCP, and it should be understood that there is no requirement of a specific order for these processes. After an entry step (step 602), the method begins by determining whether the subscriber is located in a participating destination MSCID (step 604). If so, the RIS profile for the mobile subscriber is checked to determine whether call delivery in that location is allowed (step 606). If so, the incoming call is then delivered to the subscriber (step 616). If a partial A-number list is available (step 608), the call may be delivered if there is a match. Otherwise, the full A-number screen is used (step 610) for determining the call treatment. Additionally, a personal A-number list (on-the-fly A-numbers) may be checked (step 612) to see if the incoming call may be delivered to the mobile subscriber.

If the subscriber is not located in a participating destination MSCID (as determined by the decision block 604), the process may check to see if any additional screening checks may be available (step 624), such as those described above. If they are not available or desired, a pre-recorded announcement may be provided to the calling party (step 618), which may also be available as an option when the additional screens do not yield a call delivery result. Extra options may be provided when all delivery screens fail such as, for example, a C-number forwarding (step 620) and the like (step 622).

Based upon the foregoing, it should now be apparent to those of ordinary skill in the art that the present invention provides an advantageous solution which offers enhanced subscriber services in terms of plural call delivery options for a mobile subscriber. Further, cost-conscious mobile subscribers will be able to better manage their mobile telephony bills in areas where the called party pays. Although the system and method of the present invention have been described in particular reference to certain radio telecommunications messaging standards (for example, the ANSI-41 standard), it should be realized upon reference hereto that the innovative teachings contained herein are not necessarily limited thereto and may be implemented advantageously with any applicable radio telecommunications standard.

In addition, it is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow. For example, while the geographic area covered by the exemplary radio telecommunications network is depicted as a plurality of contiguous regions, it is not a requirement for the purposes of the present invention. Also, in a similar fashion, it is not required that a Group-ID comprise one or more MSCs that serve contiguous regions.

Moreover, if the mobile subscriber has subscriptions to other WIN services, there may be certain interactions between such services and the RIS service disclosed herein. It is contemplated that to the extent such interactions may arise, they will be appropriately resolved within the ambit of the present invention.

Availability of SUG member subscriptions also offers the choice of using the group data as for call delivery options. In this way, for instance, an incoming call may be forwarded to the location defined by the group data, provided the subscriber has no member data. Furthermore, additional services such as, for example, the Group Data Override (GDO), may be provided to group members of the RIS service. The GDO service provides its subscriber the ability to override the restrictions imposed by the group.

Accordingly, it should be understood by those of ordinary skill in the art that all these and other such permutations, combinations, rearrangements and extensions of the innovative teachings contained herein are expressly deemed to be part of the scope of the present invention which is solely limited by the following claims.

What is claimed is:

1. A radio telecommunications network system covering a geographic area comprised of a plurality of service areas each of which is served by a mobile switching center (MSC) having an identification indicator (MSCID), wherein the MSCIDs are clustered into one or more groups and each group covers a corresponding region, the system including:
   a Home Location Register (HLR) which comprises:
      a subscriber profile record associated with a mobile subscriber, the subscriber profile record including a service trigger for invoking a termination service; and
      means for generating a call treatment instruction based on the service trigger in the subscriber profile record; and
   a Service Control Point (SCP) for executing a call delivery service script in response to the call treatment instruction provided by at least the HLR, wherein the SCP includes a service profile record which comprises indication that an incoming call placed by a calling party is not to be delivered to the mobile subscriber when the mobile subscriber is located in a first region served by an MSC in a first group.

2. The radio telecommunications network system as set forth in claim 1, further comprising means, available to the subscriber, for selectively updating the subscriber profile record in the HLR.

3. The radio telecommunications network system as set forth in claim 1, wherein the HLR and the SCP are co-located and further wherein the service profile record includes a portion for indicating that the incoming call is to be delivered to the subscriber while the subscriber is located in a second region of the geographic area served by an MSC in a second group.

4. The radio telecommunications network system as set forth in claim 3, wherein the second region of the geographic area comprises a home service area for the mobile subscriber.

5. The radio telecommunications network system as set forth in claim 3, wherein the second region of the geographic area comprises a visited service area.

6. The radio telecommunications network system as set forth in claim 1, wherein the service profile record includes a portion for indicating that the incoming call is to be delivered to the subscriber regardless of the subscriber's location within the geographic area, provided the incoming call is placed from a selected telephone number.

7. The radio telecommunications network system as set forth in claim 1, wherein the service profile record includes a portion for indicating that the incoming call is to be delivered to the subscriber regardless of the subscriber's location within the geographic area, provided the incoming call is placed from a telephone number having a selected area code.

8. The radio telecommunications network system as set forth in claim 1, further comprising means for forwarding the incoming call when the incoming call is not delivered to the subscriber.

9. The radio telecommunications network system as set forth in claim 1, further comprising means for providing an announcement to the calling party when the incoming call is not be delivered to the subscriber.

10. The radio telecommunications network system as set forth in claim 1, further comprising means, available to the subscriber, for dynamically providing an originating telephone number to the SCP, wherein, when the incoming call is placed from the originating telephone number, the call is to be accepted regardless of the subscriber's location within the geographic area.

11. A radio telecommunications network system, comprising:

a first plurality of mobile switching centers (MSCs), each of which serves a first corresponding service area;

a second plurality of mobile switching centers (MSCs), each of which serves a second corresponding service area;

a Home Location Register (HLR) for keeping track of a mobile subscriber's location and for storing the mobile subscriber's service category profile, wherein the service category profile includes a service trigger; and a Service Control Point (SCP) for executing one or more service scripts associated with the mobile subscriber responsive to the service trigger in the HLR, wherein the SCP includes a service profile record having at least one indication that when the mobile subscriber is located in the first corresponding service area, an incoming call placed by a calling party is to be delivered to the mobile subscriber, and at least one indication that when the mobile subscriber is located in the second corresponding service area, the incoming call placed by the calling party is not to be delivered to the mobile subscriber.

12. The radio telecommunications network system as set forth in claim 11, wherein the service profile record further includes an indication that the incoming call is not to be delivered to the mobile subscriber if the calling party's telephone number does not match a selected telephone number stored in the call delivery profile.

13. The radio telecommunications network system as set forth in claim 11, wherein the service profile record further includes an indication that when the incoming call is not delivered to the mobile subscriber, an announcement is to be provided to the calling party.

14. The radio telecommunications network system as set forth in claim 11, wherein the service profile record further includes an indication that when the incoming call is not delivered to the mobile subscriber, the incoming call is to be provided to a voice mail system.

15. The radio telecommunications network system as set forth in claim 11, wherein the first plurality of MSCs includes at least one MSC which, together with the HLR and the SCP, forms a home network for the mobile subscriber.

16. A method of call termination with respect to a mobile subscriber in a radio telecommunications network, comprising the steps of:

receiving, by a mobile switching center (MSC), an incoming call from a calling party, wherein the incoming call is intended for the mobile subscriber;

interrogating, by the MSC, a Home Location Register (HLR) to determine a location of the mobile subscriber;

determining, in the HLR, whether a termination service trigger is provided for the mobile subscriber;

if so, determining, in the SCP, whether the incoming call is to be delivered to the mobile subscriber via a call delivery, based on the location of the mobile subscriber; and selectively delivering the call to the mobile subscriber.

17. The call termination method as set forth in claim 16, further comprising the step of forwarding the incoming call to a voice mail system when the call delivery to the mobile subscriber is not allowed.

18. The call termination method as set forth in claim 16, further comprising the step of providing an announcement to the calling party when the call delivery to the mobile subscriber is not allowed.

19. The call termination method as set forth in claim 16, further comprising the steps of:

determining whether the calling party's telephone number matches a selected telephone number for which the call delivery is allowed; and responsive to the determining step, selectively delivering the call to the mobile subscriber.

20. The call termination method as set forth in claim 19, wherein the selected telephone number is a pre-determined number stored in the SCP.

21. The call termination method as set forth in claim 19, wherein the selected telephone number is a telephone number dynamically provided by the mobile subscriber using a mobile station.

* * * * *